June 9, 1931.   T. DE KONING   1,809,783
INSTRUMENT CALIBRATING APPARATUS
Filed Jan. 27, 1925   3 Sheets-Sheet 1
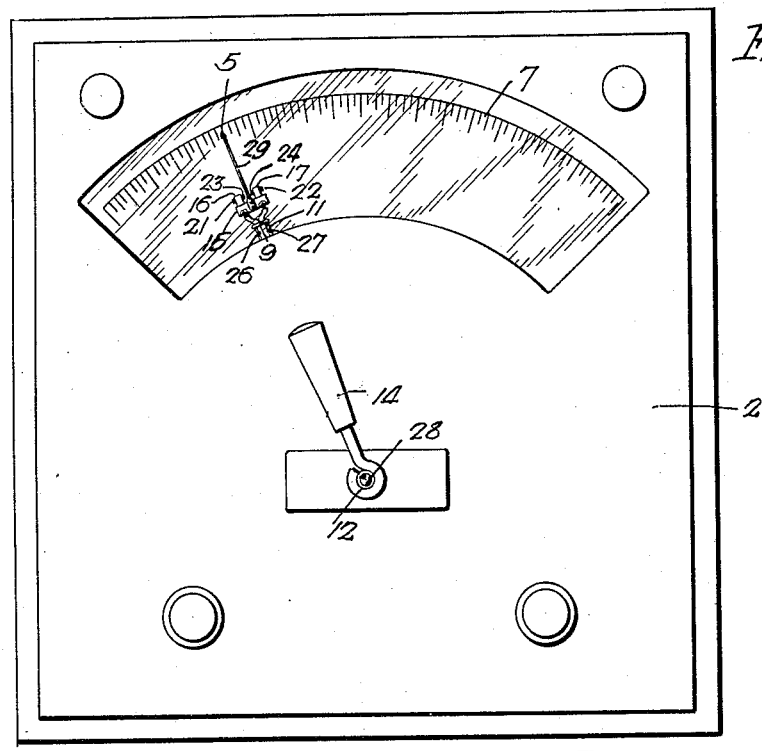
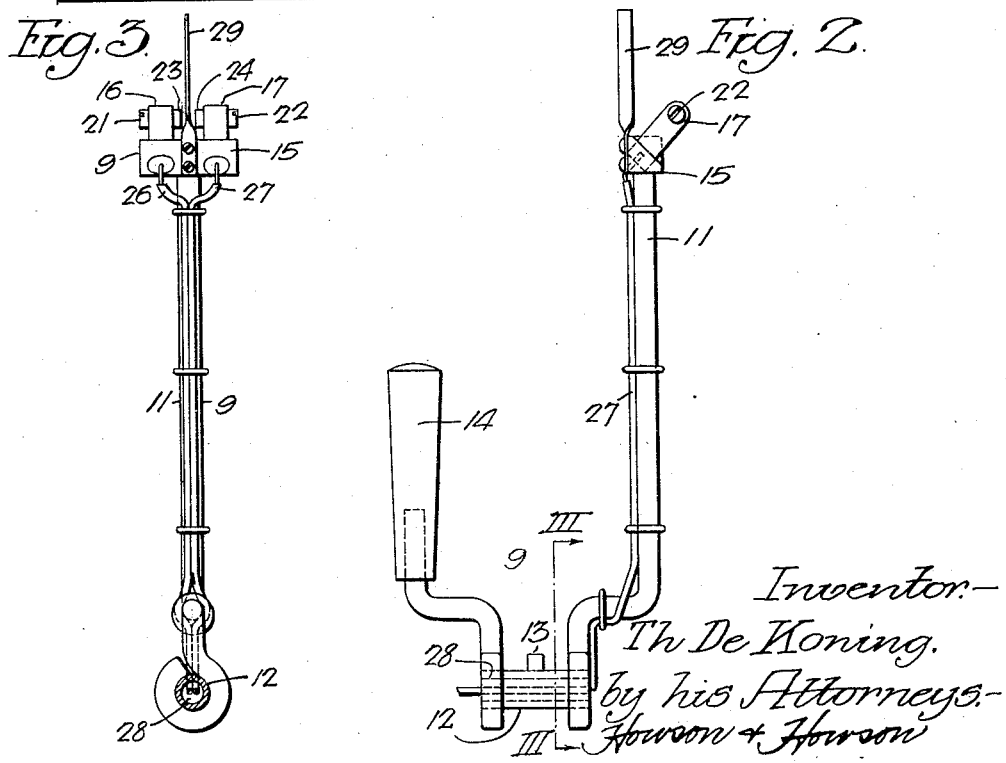
Inventor-
Th. De Koning.
by his Attorneys
Howson & Howson

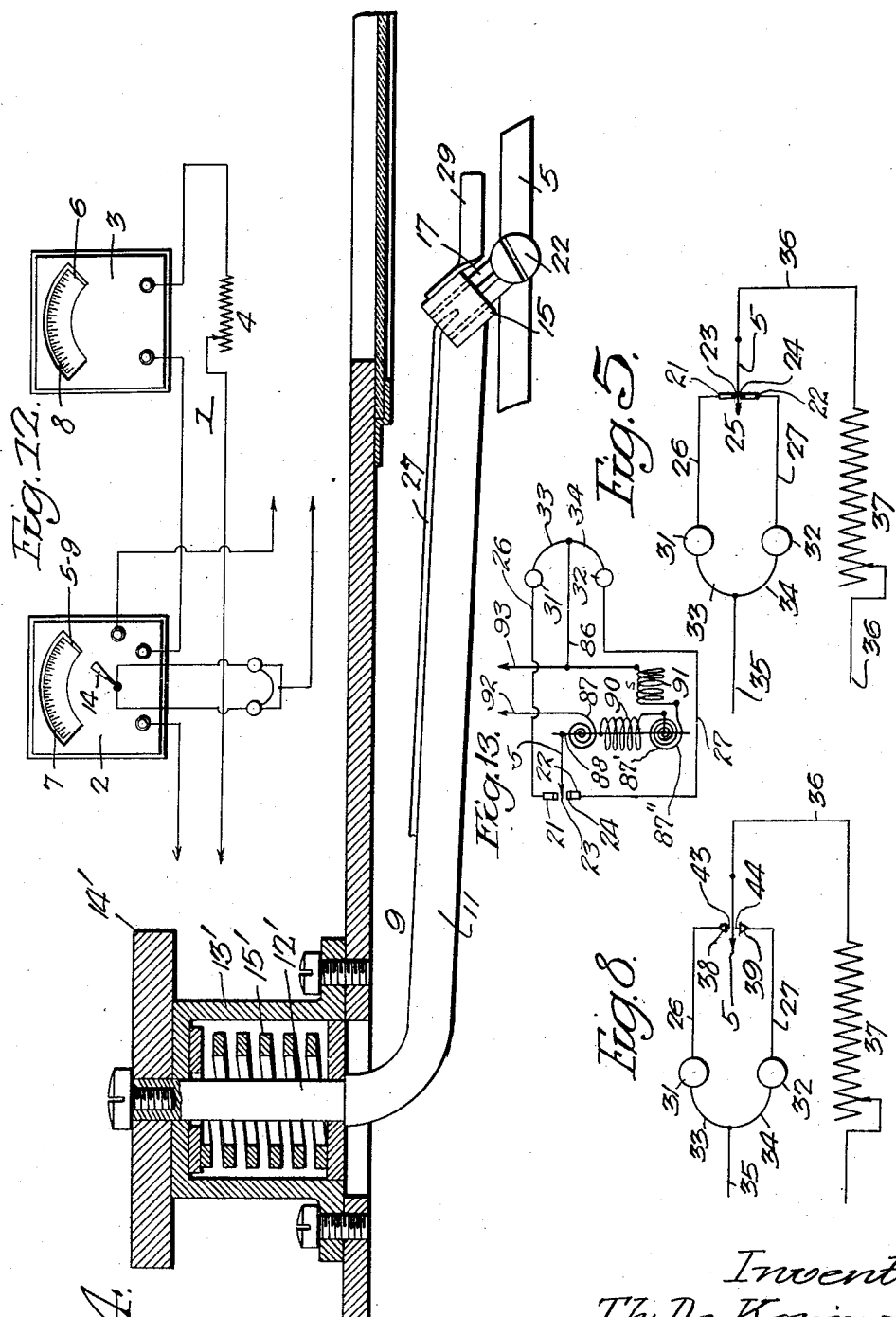

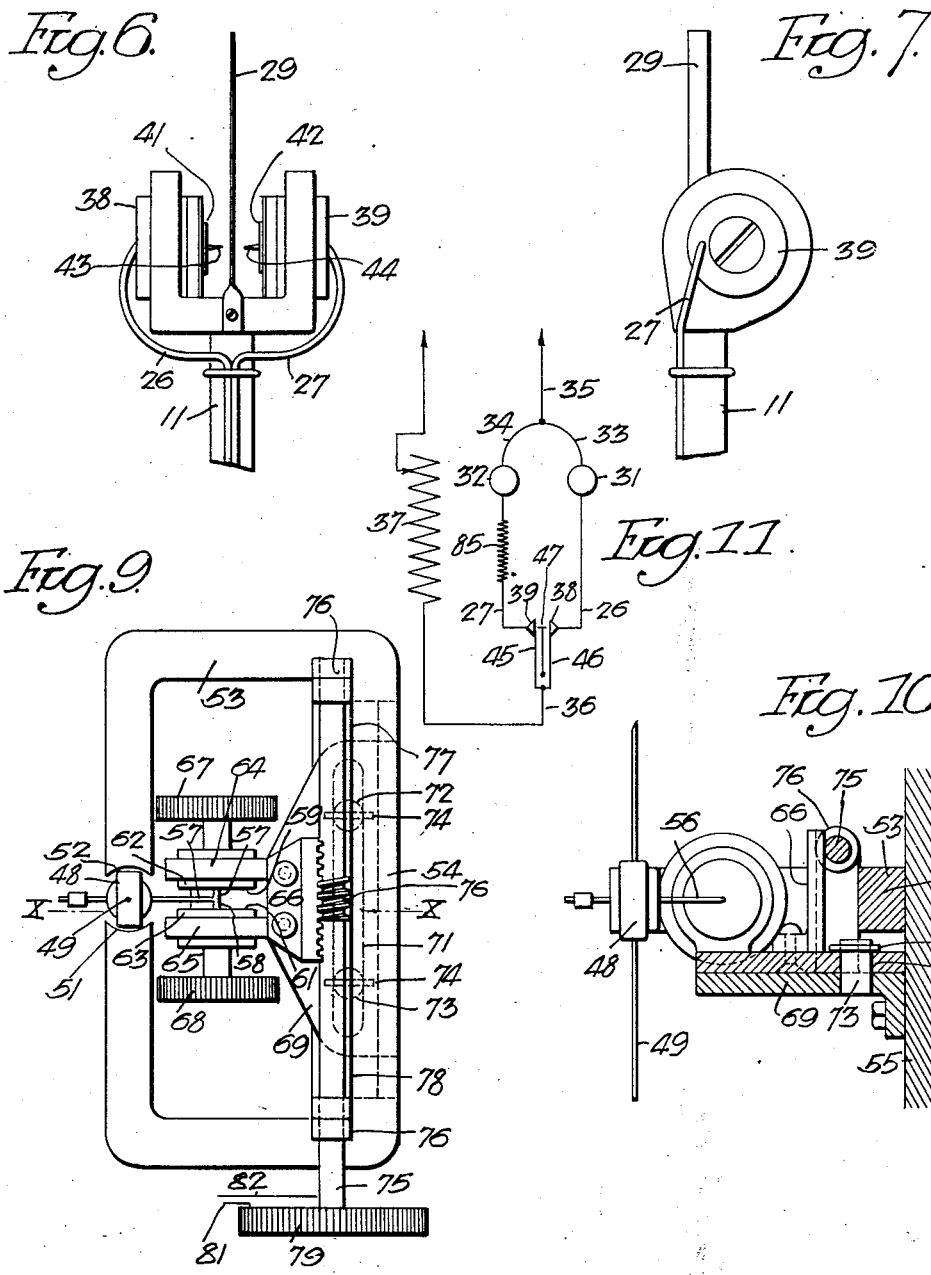

Patented June 9, 1931

1,809,783

UNITED STATES PATENT OFFICE

THEODOOR DE KONING, OF BROOKLYN, NEW YORK

INSTRUMENT CALIBRATING APPARATUS

Application filed January 27, 1925. Serial No. 5,174.

My invention relates to electrical instruments and more especially to a means for and method of calibrating electrical instruments.

One object of my invention is to provide a method of calibrating electrical instruments that shall be characterized by the saving in labor afforded; by the accuracy of calibration; by the lack of the usual damping devices; and by the direct indication of the degree of accuracy of calibration.

Another object of my invention is to provide an electrical instrument comprising a galvanometer coil, a pair of microphones for controlling the intensity of sound in a telephone in accordance with the torque of said coil, and means permitting the adjustment of said microphones relative to said coil to a point where both microphones are similarly affected by said coil.

With these and other objects and applications in mind, my invention further consists in the details of construction and operation and arrangement, hereinafter described and claimed and illustrated in the acompanying drawings, wherein Fig. 1 is a top plan view of a standard instrument with the adjusting members positioned to retain the instrument needle at a desired scale deflection;

Fig. 2 is a detail side elevational view of the adjusting member of Fig. 1;

Fig. 3 is a horizontal sectional view of the structure of Fig. 2 taken on the line III—III thereof;

Fig. 4 is a detail elevational view partially in longitudinal section of an alternative form of adjusting member;

Fig. 5 is a diagrammatic view of an indicating circuit and associated apparatus;

Figs. 6 and 7 are detail plan and elevational views, respectively, of an alternative construction for the end portion of the adjusting member co-operating with the standard instrument needle;

Fig. 8 is a diagrammatic view of an indicating circuit and associated apparatus embodying the alternative construction of Figs. 6 and 7;

Fig. 9 is a side elevational view of an electrical instrument, illustrating a further application of my invention;

Fig. 10 is a transverse sectional view taken on the line X—X of Fig. 9;

Fig. 11 is a diagrammatic view of an indicating circuit and associated apparatus adapted to the structure of Figs. 9 and 10;

Fig. 12 is a view, partially diagrammatic and partially structural, of the main energizing circuit, the standard instrument and the instrument to be calibrated; and Fig. 13 is a diagrammatic view of an alternative indicating circuit.

The accurate prior art methods of testing and calibrating electrical measuring instruments require at least two operators, the first being the tester who makes the adjustments and marks the scale of the instrument to be tested, and the second being the reader who gives the tester the required readings on the standard instrument.

According to my invention, a single operator only is required, and this is illustrated in the drawings, attention being first directed to Figs. 1 to 3, inclusive, and 12. In the structure therein disclosed, a main energizing circuit 1, extending from an energy source (not shown), includes in series-circuit relation a standard instrument 2, an instrument 3 to be tested and a variable resister 4. The variable resister 4 is adapted to cause such changes in the intensity of the currents traversing the circuit 1 that indicating needles 5 and 6 of the instruments 2 and 3, respectively, may be moved from the minimum to the maximum points of deflection. The indicating members 5 and 6 co-operate respectively with the scales 7 and 8. The instruments 2 and 3 may be of any type, and are shown in the present instance as current-measuring instruments for purposes of illustration only.

The standard instrument 2 is provided with an adjusting member 9 (Figs. 2 and 3) adapted to permit the actuation of the standard instrument needle 5 to any desired scale deflection, said adjusting member 9 comprising a horizontally extending arm 11, one end of which is secured to a vertically positioned pivot member 12 rotatably mounted in the upper cover of the standard instrument 2.

The pivot member 12 may be provided with a pin 13, which co-acts with a slot 11', Fig. 2, in said upper cover so that the arm 11 may be retained in an elevated position clear of the path of travel of the needle 5 and so long as an outside operating handle 14 is in a predetermined position or range of positions.

An alternative method of supporting the arm 11 of the adjusting member 9 is shown in Fig. 4, where one end thereof is provided with a vertical extension 12' that is disposed in a housing 13' mounted on the upper cover of the instrument 2. An external portion of the extension 12' is provided with an operating handle 14', while a spring 15' encircles an inner portion which is positioned within the housing 13' so as to tend to maintain the adjusting member 9 in the position shown in Fig. 4, but permitting the same to be moved vertically of the standard instrument needle 5 and then horizontally to a desired position.

The free end of the arm 11 carries an insulating block 15 providing a mounting for outwardly extending spaced projections 16 and 17. The outer ends of the latter are provided with threaded perforations for the reception of adjustable screw members 21 and 22, respectively. The adjacent ends of the screw members 21 and 22 may be provided with platinum or other non-corrodible tips 23 and 24, respectively. As previously noted, the adjusting screws 21 and 22 are so disposed with respect to the needle 5 of the standard instrument 2 that the platinum tips 23 and 24 are respectively engaged as the needle 5 moves in opposite directions.

The adjusting screws 21 and 22, which constitute the stationary contact elements of a switch 25 (Fig. 5), of which the instrument needle 5 constitutes the movable contact element, are connected to a pair of conductors 26 and 27 which extend along the supporting arm 11 to the pivot member 12. The latter is provided with a central perforation 28 providing an outlet for the ends of the conductors 26 and 27. A pointer 29, which is secured to the upper side of the insulating block 15, serves to indicate the position of the adjusting member 9 with respect to the scale 7 of the standard instrument 2, and it is disposed directly above the path of travel of the standard instrument needle 5.

As shown in Fig. 5, the conductors 26 and 27 are respectively connected to translating devices 31 and 32, which may comprise the units of the usual telephone head set, but, of course, my invention is not to be limited to such form of indicating means. The translating devices 31 and 32 are respectively connected by conductors 33 and 34 to a common conductor 35 extending to one terminal of a source of electrical energy (not shown). A conductor 36 connects the other terminal of said energy source to the standard instrument needle 5. The intensity of the currents traversing the indicating circuit just defined may be limited to any desired value by means of a resistor 37 which is included in one of the conductors 35, 36, say the latter. The energy source referred to may be such as to establish direct or alternating currents in said indicating circuit, which comprises the conductors 35 and 36 and the divided or branch circuits defined by the conductors 26—33 and 27—34, respectively.

When it is desired to calibrate the instrument 3 against the standard instrument 2 with the circuits and apparatus above described, the adjusting member 9 is removed from the casing of the standard instrument 2 and the adjusting screws 21 and 22 are turned until the tips 23 and 24 thereof are spaced a distance of, say, one-half millimeter, representing the desired limits of accuracy. The adjusting member 9 is then replaced in the standard instrument 2 with the contact tips 23 and 24 disposed on opposite sides of the indicating needle 5. The handle 14 is now actuated to move the arm 11 and consequently the needle 5 to, say, the full-scale deflection.

Assuming alternating currents to be traversing the main energizing circuit 1, which are below the value necessary to maintain the needle 5 in said advanced position, said needle engages the contact tip 23 of the adjusting screw 21. A circuit is thus completed which extends from one side of the energy source (not shown) through the conductor 36, the resistor 37, the standard instrument needle 5, the adjusting screw 21, the conductor 26, the translating device 31, the conductor 33 and the conductor 35 to the other side of said energy source. Hence, when the currents through the standard instrument 2 are below the required value, a note is heard in the phone unit 31.

The operator then adjusts the resistor 4 of Fig. 12 until the currents traversing the standard instrument 2 exceed the value required to maintain the instrument needle 5 in the advanced position, and this is indicated by a note in the other phone unit 32, inasmuch as the circuit through the latter has been completed by the movement of the instrument needle 5 out of engagement with the adjusting screw 21 and into engagement with the adjusting screw 22.

The resistor 4 is now adjusted to decrease the currents until they are just sufficient to maintain the standard instrument needle 5 in the desired position, that is, between the adjusting screws 21 and 22, and this position is indicated by the absence of the current clicks or hum in either of the translating devices 31 and 32. The operator now marks the position of the needle 6 on the scale 8, which position represents the full scale reading. As will be readily apparent, the operator or meter tester may determine the accuracy of the reading by noting the length of the period of silence, thereby reducing the number of check readings required without impairing the accuracy of the calibration. The position of the next desired scale marking on the instrument 3 may be ascertained in the same manner as just described for the full scale reading.

An alternative method of indicating the movement of the instrument needle 5 from a desired position is illustrated in Figs. 6, 7 and 8, wherein the adjustable screw members 21 and 22 are replaced by microphones 38 and 39, movable elements 41 and 42 of which are respectively provided with projecting members 43 and 44 adapted to be disposed on opposite sides of the standard instrument needle 5 when the operating member 9 is in its lower effective position. The spacing of the projections 43 and 44 may be adjusted in any manner, as by bodily moving the microphones 38 and 39, whereby the accuracy of calibration may be adjusted to the desired value. The circuit diagram of Fig. 8, which embodies the above features, thus differs from that of Fig. 5 only in the replacement of the adjusting screws 21 and 22 by the microphones 38 and 39. It is noted, however, that the projections 43 and 44 serve as contacts similar to the contact tips 23 and 24, respectively. Since the method of calibration herein involved is the same as that for the preceding figures, a furthr description is not deemed necessary.

A still further method of indicating the departure of the standard instrument needle 5 from a predetemined position is illustrated in Fig. 11, wherein the microphones 38 and 39 of Fig. 8 are permanently energized, regardless of the position of the needle 5, conductors 45 and 46 respectively connecting said microphones 38 and 39 to the conductor 36. In the present method of calibration, the projections 43 and 44 may be employed to co-act with the instrument needle 5 or the latter may be secured by a transversely extending member 47 to the movable elements 41 and 42 of the microphones 38 and 39, respectively, so that a movement of the needle 5 increases the resistance of one microphone and decreases that of the other, causing corresponding changes in the tone of the phone units 31 and 32. The difference between the true and the desired deflection of the standard instrument 2 may thus be definitely ascertained by noting the difference in the intensity of the sound in the phone units 31 and 32.

My invention further contemplates an improved form of galvanometer of simple and compact design which is further characterizes by its relatively small inertia by the absence of the usual scale positioned at a relatively large distance from the instrument; and by the provision of a suspended wire of increased strength. An instrument embodying these features is disclosed in Figs. 9 and 10 of the drawings, wherein a galvanometer coil 48 of usual design is suspended by a wire 49 in a magnetic field established by spaced poles 51 and 52 of a permanent magnet 53, a base portion 54 of which is positioned to be mounted on a wall 55 of the instrument.

Extending horizontally from the galvanometer coil 48 is a contact arm 56 having oppositely extending projections 57 and 58 positioned in engagement with movable elements 59 and 61 of microphones 62 and 63, respectively. The microphones 62 and 63 are respectively mounted in arms 64 and 65 of a supporting plate 66 and these may be laterally adjusted in said arms with respect to the contact arm 56 by adjusting screws 67 and 68, respectively. The supporting plate 66 slidably engages a vertically extending base plate 69 and it is provided with a longitudinal slot 71 for the reception of pins 72 and 73 which extend from the base plate 69. The outer ends of the pins 72 and 73 are provided with transversely extending elements 74 which engage the outer surface of the movable supporting plate 66 and thus retain it in position as it is moved longitudnally of the base member 69.

The longitudinal movement of the supporting plate 66 may be effected by means of a rod 75 having a worm portion 76. Opposite ends of the rod 75 are supported in bearings provided by outwardly extending projections 77 and 78 from the base plate 69. An operating handle 79 is preferably secured to an outer end of the rod 75 and it is provided with a pointer 81 movable over a scale 82 supported by the wall 55. The worm portion 76 of the rod 75 meshes with a worm-wheel segment 83 formed on the underside of an arm 84 extending outwardly from the movable supporting plate 66. Thus it is apparent that the position of the microphones 62 and 63 may be simultaneously adjusted by the operating handle 79 and that the extent of movement necessary to effect said adjustment is indicated by the pointer 81 and the scale 82. The latter may be calibrated to indicate directly the intensity of the currents traversing the coil 48.

When it is desired to employ the instrument of Figs. 9 and 10, in the method of calibration illustrated in Fig. 11, the microphones 38 and 39 shown in the latter figure are replaced by the microphones 62 and 63, shown in the former figure. In addition, the standard instrument 2 is removed from the main energizing circuit 1, the galvanometer coil 48 replacing that of said standard instrument. In adjusting the instrument, the pointer 81 is first moved to the zero position on the scale 82 and the micrometer adjusting screws 67 and 68 turned until the sound in both phones 31 and 32 is substantially equal. If desired, a more accurate adjustment may be made by means of a balancing resistor 85. In operation, the handle 79 is turned to bring the pointer 81 to the desired scale deflection, and the currents in the circuit 1 thereafter adjusted by the resistor 4 until the sound intensity of both phones 31 and 32 is equal. At this instant the position of the instrument needle 6 is noted on the scale 8, all as described for the preceding figures.

A further application of the so-called microphone galvanometer of Figs. 9 and 10 is in the measurement of a resistor in connection with a Wheatstone bridge. In such application, the resistance of the plug box is first adjusted to the approximate value of the unknown resistance. The key of the bridge is then closed, and if the sound is strongest in the left phone, the resistance in the plug box is too small. Accordingly, the resistance is increased until the same intensity of sound occurs in both the phone units 31 and 32.

In the practical application of my invention, I have further found that the energy source (not shown) that is associated with the indicating circuits of Figs. 5, 8 and 11 may be eliminated by employing the circuit arrangement of Fig. 13. In this figure, the common terminal of the conductors 33 and 34 is connected by a conductor 86 to one end of a stationary coil 91 and, by means of conductor 93, to one side of the source of electrical energy. The other end of the stationary coil 91 is connected to one end of the lower portion 87″ of spring 87′. The other end of the spring portion 87″ is connected to one end of a movable coil 90, the other end of which is connected to one end of the upper portion 87 of the spring 87′ and to the indicating needle 5. The other end of the spring portion 87 is connected to the other terminal of the source of electrical energy by means of conductor 92. The connection between the pointer 5 and the adjacent end of the spring portion 87 is made by the pivot rod 88 which also serves to support the instrument pointer 5 and the coil 90. Since the coils 90, 91 and the spring 87′ are serially connected in the circuit 1, a source of electromotive force is included in this indicating circuit which is represented by the voltage drop across the upper portion 87 of the spring 87′. Hence, the movement of the needle 5 into engagement with the stationary contact elements 21 and 22 causes clicks in the respective indicating devices 31 and 32.

Although I have described certain embodiments of my invention in detail, and although I have pointed out certain of the most obvious principles and purposes thereof, I do not intend that the language employed in the following claims shall be limited to the precise features described, but I intend that the claims shall be construed to cover all combinations which are fairly included in the language thereof, when read in connection with the prior art, regardless of the details and functions mentioned in the description or illustrated in the drawings.

I claim:

1. In an apparatus for calibrating electrical measuring instruments, the combination with an electric circuit including a standard instrument having a movable element adapted to be actuated by an energizing current, of means for moving said element to a predetermined position independent of the energization of said instrument, means for adjusting the energizing current to a value approximately equal to that required to maintain said element in said predetermined position, and means in said first-mentioned circuit for indicating when the energizing current is substantially equal to that required to maintain said movable element in said predetermined position.

2. In an apparatus for calibrating electrical measuring instruments, the combination with an electric circuit including a standard instrument having a movable element adapted to be actuated by an energizing current, of means for moving said element to a predetermined position independent of the energization of said instrument, means for adjusting the energizing current which actuates said movable element to a value approximately equal to that required to maintain said element in said predetermined position, and differential means for indicating within predetermined limits changes in the intensity of the energizing current from that required to maintain said movable element in said predetermined position.

3. In an apparatus for calibrating electrical measuring instruments, the combination with a standard electrical instrument having a movable element, means for indicating a departure of said element from a desired position, said means comprising an energizing circuit serially including said movable element and a pair of branch circuits, said movable element being so disposed with respect to said branch circuits that the latter are respectively energized on opposite movements of said element in excess of predetermined limits, and a telephone device associated with said branch circuits for indicating a departure of said movable element from said desired position.

4. In an apparatus for calibrating electrical measuring instruments, the combination with a standard instrument having a movable indicating needle, an adjusting member having elements spaced in cooperative relation to said needle whereby the needle may be actuated to a desired position and permitted to move within predetermined limits, and a circuit having a divided portion respectively connected to said spaced elements, said divided portion including translating devices for indicating a departure of the needle from said desired position.

5. In an apparatus for calibrating electrical measuring instruments, the combination with an electric circuit including a standard instrument having a movable element adapted to be actuated by an energizing current, of means for moving said element to a predetermined position independent of the energization of said instrument, means for adjusting the energizing current which actuates said movable element to a value approximately equal to that required to maintain said element in said predetermined position, and differential means for indicating within predetermined limits changes in the intensity of the energizing current from that required to maintain said movable element in said predetermined position, said differential means comprising a pair of spaced translating devices adapted to be actuated by said movable element.

6. In an apparatus for calibrating electrical measuring instruments, the combination with an electric circuit including a standard instrument having a movable element adapted to be actuated by an energizing current, of means for moving said element to a predetermined position independent of the energization of said instrument, means for adjusting the energizing current which actuates said movable element to a value approximately equal to that required to maintain said element in said predetermined position, and differential means for indicating within predetermined limits changes in the intensity of the energizing current from that required to maintain said movable element in said predetermined position, said differential means comprising a pair of spaced microphones adapted to be actuated by said movable element.

7. In an apparatus for calibrating electrical measuring instruments, the combination with a standard electrical instrument having an indicating needle mounted on a pivot rod carrying a coiled spring having one terminal connected to said pivot rod and to said needle, the other terminal being adapted to be connected to a main energizing circuit, an actuating winding for said needle in said circuit, and a pair of circuits having means responsive to movements of said needle and a common connection, said connection comprising said spring, whereby the potential drop across said spring due to energizing current constitutes a source of electromotive force for said pair of circuits.

8. In an apparatus for calibrating electrical measuring instruments, the combination with a standard instrument having a movable indicating needle, an adjusting member having elements spaced in cooperative relation with said needle whereby the needle may be actuated to a desired position and permitted to move within predetermined limits, said indicating needle being mounted on a pivot rod carrying a coiled spring having one terminal connected to said pivot rod and to said needle, the other terminal being adapted to be connected to a main energizing circuit, an actuating winding for said needle in said circuit, and a pair of circuits having means responsive to movements of said needle, and a common connection, said connection comprising said spring, whereby the potential drop across said spring due to energizing current constitutes a source of electromotive force for said pair of circuits.

TH. DE KONING.